United States Patent
Ahmed et al.

(10) Patent No.: US 9,292,586 B2
(45) Date of Patent: Mar. 22, 2016

(54) SYSTEM AND METHOD FOR SYNCHRONIZING A REPOSITORY WITH A DECLARATIVE DEFINTION

(75) Inventors: Haroon Ahmed, Bellevue, WA (US);
Chris Anderson, Redmond, WA (US);
Oz Evren, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 454 days.

(21) Appl. No.: 12/256,426

(22) Filed: Oct. 22, 2008

(65) Prior Publication Data
US 2010/0088274 A1   Apr. 8, 2010

Related U.S. Application Data

(60) Provisional application No. 61/102,566, filed on Oct. 3, 2008.

(51) Int. Cl.
*G06F 17/30* (2006.01)
(52) U.S. Cl.
CPC .................. *G06F 17/30581* (2013.01)
(58) Field of Classification Search
CPC ............ G06F 17/30286; G06F 17/30595; G06F 17/30607; G06A 40/10
USPC .......... 707/610, 613, 615, E17.009, E17.014, 707/793
See application file for complete search history.

(56) References Cited

U.S. PATENT DOCUMENTS

| | | | | |
|---|---|---|---|---|
| 5,682,535 | A * | 10/1997 | Knudsen | 717/117 |
| 5,826,076 | A * | 10/1998 | Bradley et al. | |
| 5,870,765 | A * | 2/1999 | Bauer et al. | 707/610 |
| 2008/0148223 | A1 * | 6/2008 | Bhandarkar et al. | 717/106 |
| 2008/0294613 | A1 * | 11/2008 | Iyer et al. | 707/4 |
| 2009/0037690 | A1 * | 2/2009 | Busck et al. | 711/221 |
| 2009/0089299 | A1 * | 4/2009 | Flynn et al. | 707/100 |

* cited by examiner

*Primary Examiner* — Cam-Y Truong
(74) *Attorney, Agent, or Firm* — Nicholas Chen; Doug Barker; Micky Minhas

(57) ABSTRACT

The subject disclosure relates to a method and system for synchronizing a repository with a declarative definition. The method and system includes receiving the declarative definition in which the declarative definition represents a constraint-based execution model. A script is also created that translates the declarative definition into machine code. At least one function is then performed on the repository in which the script provides instructions for the at least one function.

18 Claims, 12 Drawing Sheets

PERSON 500

| NAME | AGE | ... | ADDRESS | PHOTO |
|---|---|---|---|---|
| CHRIS | 25 | | 26 ELM ST | 0xFEE |
| | | | | |
| | | | | |
| | | | | |
| | | | | |

| ORDER | BAR VALUE |
|---|---|
| 1 | A |
| 2 | B |
| 3 | C |

| ID | BAR VALUE |
|---|---|
| XXX | A |
| YYY | B |
| ZZZ | C |

SYSTEM AND METHOD FOR SYNCHRONIZING A REPOSITORY WITH A DECLARATIVE DEFINTION

CROSS-REFERENCE TO RELATED APPLICATIONS

This application claims the benefit of U.S. Provisional Application Ser. No. 61/102,566, filed Oct. 3, 2008 entitled "SYSTEM AND METHOD FOR SYNCHRONIZING A REPOSITORY WITH A DECLARATIVE DEFINITION," the entirety of which is incorporated herein by reference.

TECHNICAL FIELD

The subject disclosure generally relates to synchronizing a repository with a declarative definition, and more particularly to generating scripts that translate the declarative definitions into machine code.

BACKGROUND

When a large amount of data is stored in a database, such as when a server computer collects large numbers of records, or transactions, of data over long periods of time, other computers sometimes desire access to that data or a targeted subset of that data. In such case, the other computers can query for the desired data via one or more query operators. In this regard, historically, relational databases have evolved for this purpose, and have been used for such large scale data collection, and various query languages have developed which instruct database management software to retrieve data from a relational database, or a set of distributed databases, on behalf of a querying client.

It is often desirable to author source code for such management functions in a declarative programming language. Unlike imperative programming languages, declarative programming languages allow users to write down what they want from their data without having to specify how those desires are met against a given technology or platform. However, current models authored in a declarative modeling language usually go through a series of tools that transform declarative definitions into various concrete implementation artifacts. Moreover, once a model is received by a database, the declarative nature of the model has been transformed into an imperative model, which may be undesirable.

Newly developed programming languages, including languages currently being developed by the assignee of this invention, will enable programmers to declaratively model schema and instances. Source code for such declarative execution models may then be compiled into declarative definitions that may be packaged for subsequent use by a repository, such as a running database management system (RDBMS). A tool, however is required to install these declarative definitions into RDBMSs. Moreover, to improve the adoptability and learning curve of such programming languages, a tool is also required to export contents of an RDBMS as declarative definitions that may be referenced by subsequent declarative source models.

Accordingly, there is a need for a method and system for synchronizing a declarative definition with a repository. Such a need includes a method and system for translating declarative definitions into machine code in which the declarative nature of the definition is preserved. The above-described deficiencies of current relational database systems and corresponding database management techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Embodiments of a method and system for synchronizing a repository with a declarative definition are described. In various non-limiting embodiments, the method includes receiving the declarative definition in which the declarative definition represents a constraint-based execution model. The method further includes creating a script that translates the declarative definition into machine code, and performing at least one function on the repository in which the script provides instructions for the at least one function.

In another non-limiting embodiment, a system includes a receiving component, a processor, and a communication component. Within such embodiment, the receiving component is configured to receive a declarative definition representing an order-independent execution model. Further within such embodiment, the processor is coupled to the receiving component and configured to create a script that translates the declarative definition. Also, the communication component is coupled to the processor and to the repository, and is configured to perform at least one function on the repository according to instructions provided by the script.

In yet another non-limiting embodiment, another method includes receiving the declarative definition in which the declarative definition represents an execution model that is constraint-based and order-independent. The method includes generating a script as a function of data received from a relational database management system (RDBMS) in which the script is a translation of the declarative definition. The method further includes performing at least one function on the RDBMS in which the script provides instructions for the at least one function, and in which the at least one function includes querying the RDBMS for a set of extended information representing metadata.

A method for exporting contents from a repository is also provided, which includes performing a constraint-based query on the repository. The method includes extracting a set of contents from the repository as a function of the query, in which the set of contents are extracted as an image file representing an order-independent execution model. The method further includes sending the image file to at least one target.

These and other embodiments are described in more detail below.

BRIEF DESCRIPTION OF THE DRAWINGS

Various non-limiting embodiments are further described with reference to the accompanying drawings in which:

FIG. 5 is an exemplary illustration of an extensible storage abstraction according to an embodiment of the invention;

FIG. 8 is an illustration of data storage according to an ordered execution model;

FIG. 9 is a non-limiting illustration of data storage according to an order-independent execution model;

DETAILED DESCRIPTION

Overview

As discussed in the background, among other things, conventional systems do not provide an adequate mechanism for synchronizing repositories with declarative definitions. Accordingly, in various non-limiting embodiments, the present invention provides a method and system for converting declarative definitions into machine code scripts to reason over contents of a repository. As a roadmap for what follows, an overview of various embodiments is first described and then exemplary, non-limiting optional implementations are discussed in more detail for supplemental context and understanding.

A synchronization tool that manages the connection of a declarative definition to a repository is provided, which offers a spectrum of basic to advanced level options manage this connection. The tool is configurable to address any of numerous case scenarios including but not limited to iterative development, product deployment, version management, auditing, and content management. In an embodiment, source code for a declarative execution model is compiled and installable into any of a plurality of repository types, in which the declarative nature of the source code is preserved. In another embodiment, a declarative definition may also be created by pulling schema and data out of an already running database. Other supportable functions include an enumeration of currently installed declarative definitions and/or uninstalling them from a running RDBMS.

Figure 1:
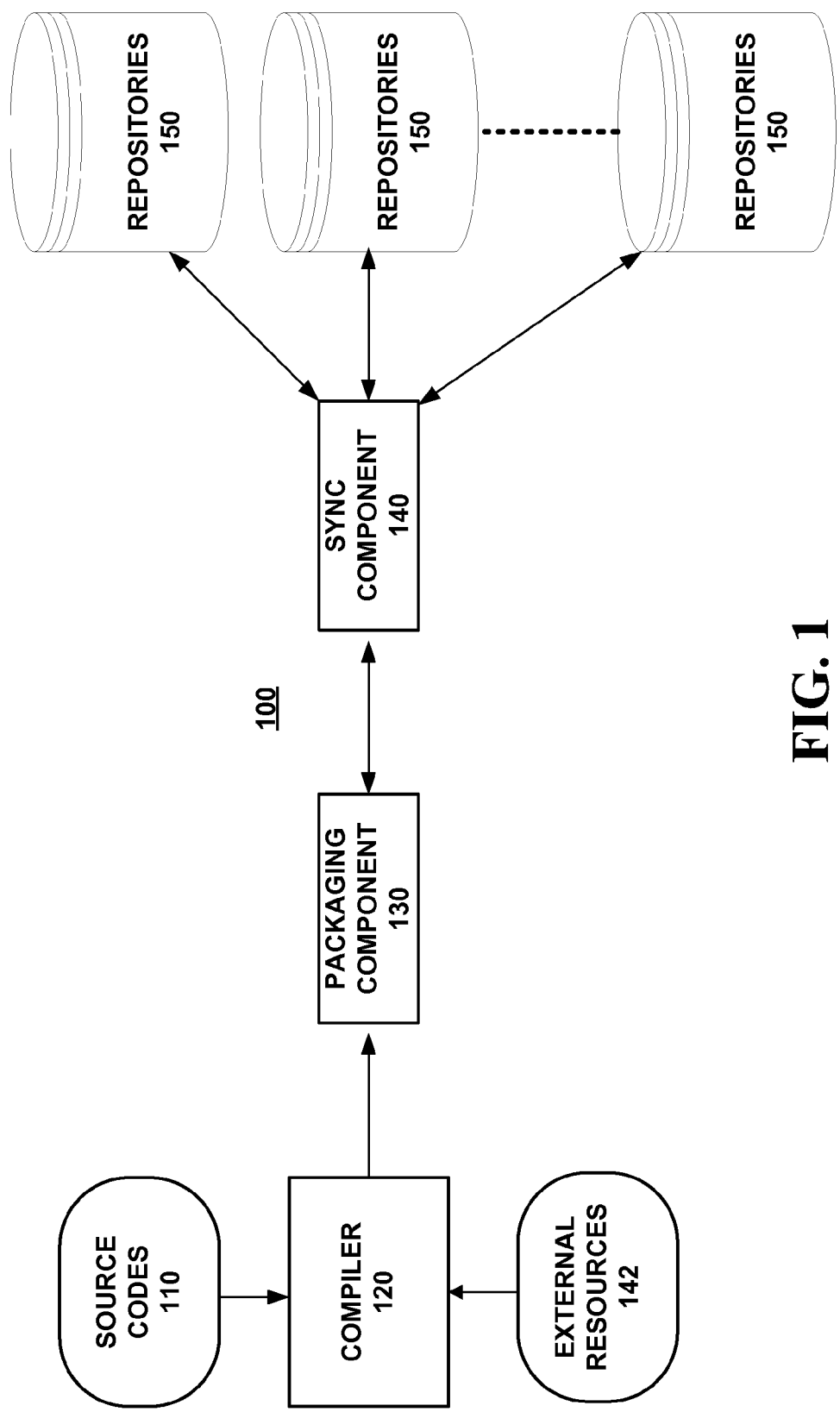
FIG. 1 is an exemplary process chain for a declarative execution model according to an embodiment of the invention.

For background, an exemplary process chain for a declarative definition according to an embodiment of the invention is provided in FIG. 1. As illustrated, process chain 100 may include a coupling of compiler 120, packaging component 130, synchronization component 140, and a plurality of repositories 150. Within such embodiment, a source code 110 input to compiler 120 represents a declarative execution model authored in a purely declarative programming language. In an embodiment of the invention, the execution model embodied by source code 110 is constraint-based and/or order-independent.

In an embodiment of the invention, compiler 120 processes source codes 110 and generates a post-processed definition for each source code. Here, although other systems do compilation down to an imperative format, an aspect of the present invention is that the declarative format of the source code, while transformed, is preserved. Within such embodiment, the post-processed definitions include the processed source code and any of a plurality of designtime/runtime artifacts associated with the processed source code. Such artifacts, for example, may include artifacts based on dependencies to subsequent source models 110, other repositories 150, and/or external resources 142 (e.g., CLR assemblies).

In an embodiment, packaging component 130 packages the post-processed definitions as image files, which are installable into particular repositories 150. Within such embodiment, image files include definitions of necessary metadata and extensible storage to store multiple transformed artifacts together with their declarative source model. For example, packaging component 130 may set particular metadata properties and store the declarative source definition together with compiler output artifacts as content parts in an image file.

In an embodiment, the packaging format employed by packaging component 130 is conformable with the ECMA Open Packaging Conventions (OPC) standards. One of ordinary skill would readily appreciate that this standard intrinsically offers features like compression, grouping, signing, and the like. This standard also defines a public programming model (API), which allows a package to be manipulated via standard programming tools. For example, in the .NET Framework, the API is defined within the "System.IO.Packaging" namespace.

In an embodiment, synchronization component 140 is a tool used to manage declarative definitions. For example, synchronization component 140 may take an image file as an input and link it with a set of referenced image files. In between or afterwards, there could be several supporting tools (like re-writers, optimizers etc.) operating over the image files by extracting packaged artifacts, processing them and adding more artifacts in the same image file. These tools may also manipulate metadata of the image file to change the state of the image file (e.g., digitally signing an image file to ensure its integrity and security).

Next, a deployment utility deploys the image file and an installation tool installs it into a running execution environment within repositories 150. Once an image file is deployed, it may be subject to various post-deployment tasks including export, discovery, servicing, versioning, uninstall and more. The packaging format may provide support for all these operations while still meeting enterprise-level industry requirements like security, extensibility, scalability and performance.

In an embodiment, repositories 150 are a collection of running relational database management systems (RDBMS). Here, however, it should be noted that the default system catalog of many RDBMSs do not provide adequate assistance to manage deployment of image files themselves or their packaged contents. In order to address this limitation, data structures included within an image file may be extracted and used to populate an extended catalog so as to augment the default system catalog of such RDBMSs.

Figure 2:
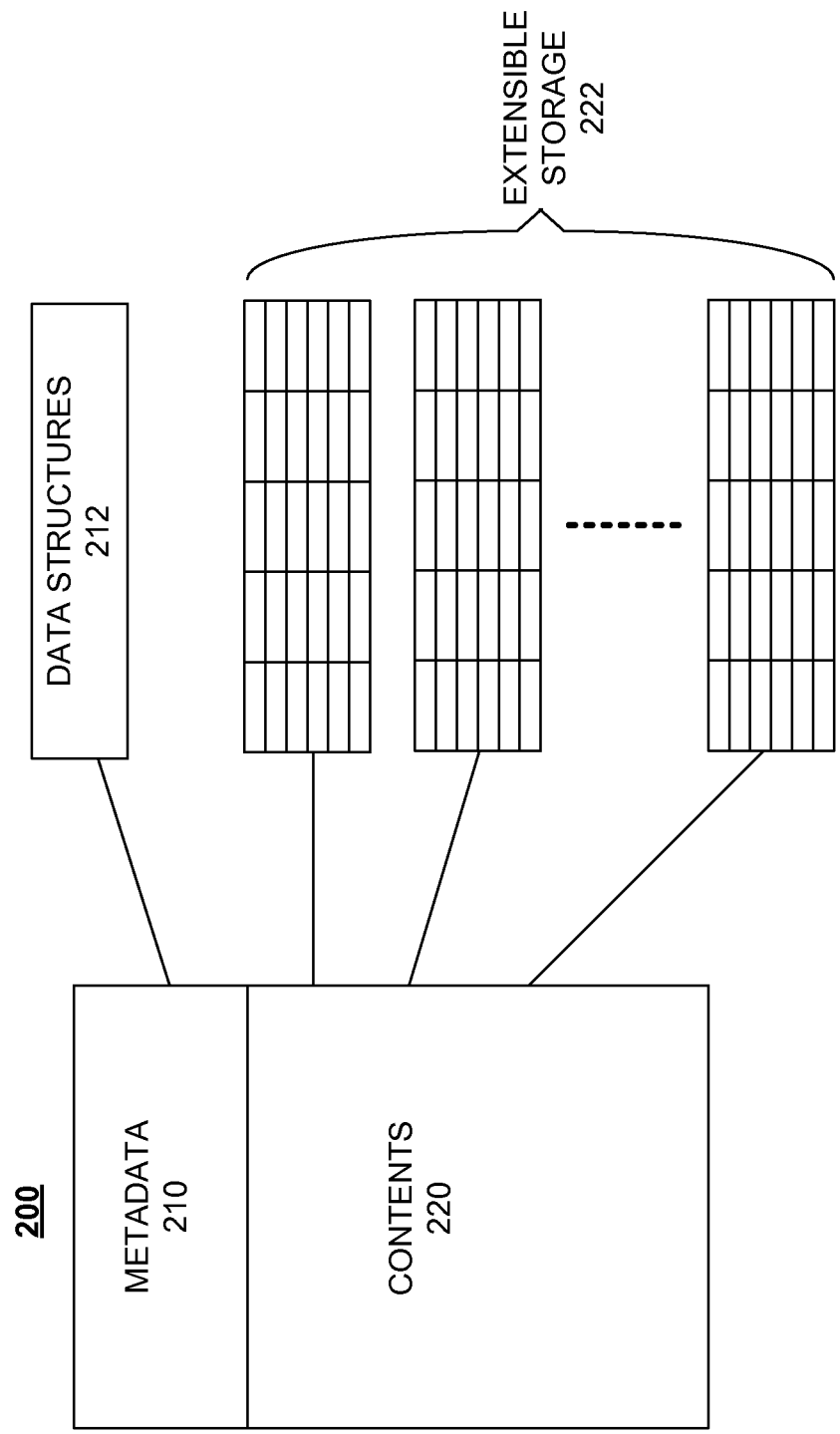
FIG. 2 is a non-limiting block diagram illustrating an exemplary representation of a post-processed declarative definition according to an embodiment of the invention.

In FIG. 2, a block diagram illustrating an exemplary non-limiting representation of an image file according to an embodiment of the invention is provided. Within such embodiment, image file 200 includes a metadata section 210 and a contents section 220, as shown. In an embodiment, the aforementioned data structures 212 used to populate an extended catalog are embedded within metadata section 210 and include metadata describing the image file contents (aka package objects). Meanwhile, content section 220 includes actual/referenced content intended for a repository in which such content may be stored/referenced within extensible storage 222 as a plurality of tables, as shown.

Figure 3:
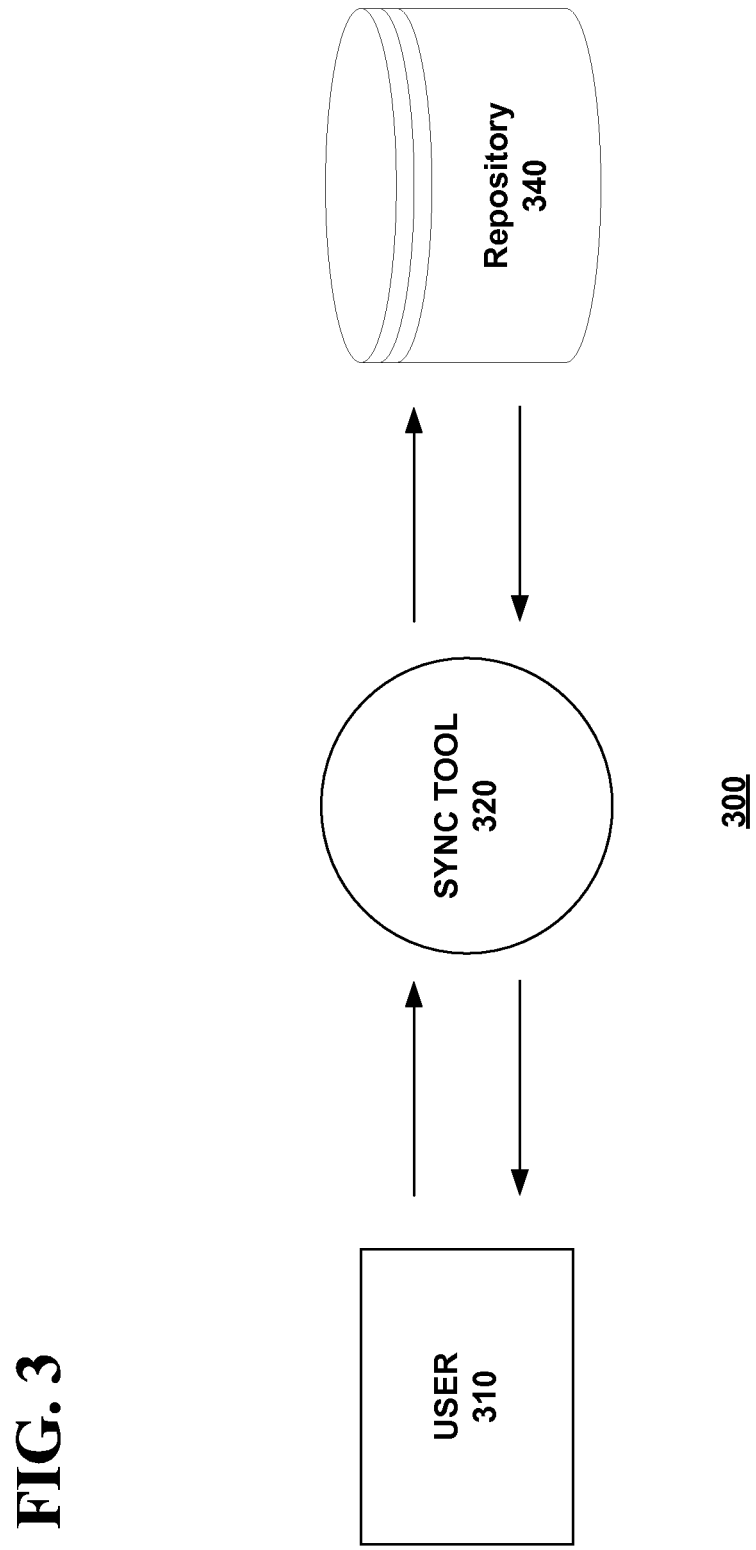
FIG. 3 is a non-limiting block diagram illustrating an exemplary communication chain for synchronizing image files according to an embodiment of the invention.

In FIG. 3, a non-limiting block diagram illustrating an exemplary communication chain for synchronizing image files is provided. Within such chain 300, sync tool 320 provides an interface between user 310 and repository 330, in which sync tool 320 may perform any of a plurality of requested tasks on repository 330. Examples of such task include, but are not limited to, installing image files, exporting image files, listing image files, and uninstalling image files.

In some embodiments, it should be appreciated that sync tool 320 may be configured to reference contents via an extended catalog. Indeed, to enable certain user scenarios and to provide a richer user experience, sync tool 320 may define a 'light up model' for recording information in an extended catalog, which may not be captured by an SQL catalog. And although sync tool 320 may function without defining a light-up model, such a light-up model provides a way to record extended metadata from an originating source library about the installed content (schema, tables, rows, resources etc.).

In an embodiment of the invention, user 310 may utilize sync component 320 to install an image file into a particular repository 330. Within such embodiment, sync tool 320 receives the image file and all its base dependencies from user 310, and given a connection string to repository 330, installs the contents of the image file into repository 330. It should be noted that, because the contents of an image file may include both schema-related contents and instance-related contents, sync tool 320 may be configured to script/execute different statement types. For example, the schema-related subset of an image file might be executed as SQL DDL statements, whereas the instance-related subset might be executed as SQL DML statements. Embedded resource files and metadata may then be installed via a light-up model, subject to its presence. It should be further noted that, although a single image file installation has been described, sync tool 320 may also be configured to install the respective contents of multiple image files into repository 330. Such installation of multiple image files may be performed sequentially or simultaneously.

In an embodiment, a default installation mode may also be provided. Within such embodiment, the default installation mode may follow a right inter-dependency order across the image files so as to provide an "incremental" installation. Moreover, the subset of contents already installed in a particular repository might be skipped, whereas the rest are installed. It should be noted that, the implementation of such a scheme, may also ensure that any already existing server constructs that are skipped are of the same signature with the desired contents. It should be further noted that, any of a plurality of non-default modes can also be used which may, for example, include modes that install image files by force and modes that install with various degrees of dependency checks.

In an embodiment, sync tool 320 also provides user 310 with a mechanism for dynamically installing the contents of an image file. Within such embodiment, any of a plurality of "what-if-analyses" are scripted into the installation instructions provided to repository 330. Such scripts may be particularly useful in a production environment to install, audit, and analyze the impact of an installation on production servers. An analysis on a script may, for example, include a comparison of the "to-be-installed" contents of an image file with the "already-installed" database contents (e.g., via a delta script against a particular database/server). A compound SQL script, which targets empty databases and accumulates all inter-dependent image files, may also be generated. Other scripts may include any of a plurality of "fail-safe" self-deployable SQL scripts (e.g., scripts safeguarded with incremental installation support; scripts that install contents by force as needed; etc.), as well as any of a plurality of "failure-prone" self-directed SQL scripts (e.g., scripts with no safeguards against already installed contents).

In an embodiment of the invention, user 310 may also utilize sync tool 320 to export contents of a particular repository 330 as an image file. Within such embodiment, it should be noted that sync tool 320 may create an image file from any content in repository 330, including content that was not originally created from an image file installation and/or content subjected to post-installation changes. In an embodiment, since the exported image file may be referenced elsewhere, the image file is forwarded to a compiler to compile subsequent source models referencing the image file and/or to install the image file in a different server/database.

Similar to the default installation mode discussed previously, a default export mode may also be provided. Within such embodiment, the default export mode may perform the export as a function of a connection string, name of the image file to export, and a filename to be exported in to the file system. In another embodiment, users could also provide the scope of "what-to-export" in the form of schema name(s), and other structure names that hold the data such as tables/views. In yet another embodiment, user 310 could provide SQL queries that define the export scope dynamically.

Another function that may be provided to user 310 is a "list" function. In an embodiment, the list function returns a directory of already installed image files to user 3 10. The list function may also include a default mode. In an exemplary embodiment, the list function may take a connection string and list all the installed libraries by first referencing a light-up model, and in its absence, lists one library per SQL schema as the default policy.

In an embodiment of the invention, sync tool 320 may be used to remove installed contents, as well as contents that were not originally created from an image file, from repository 330. Within such embodiment, sync tool 320 may reason over an SQL catalog and a light-up model, if present, to collect information about installed contents such as schema, instances, resources and metadata information that user 310 is attempting to remove. Sync tool 320 may then remove schema level constructs (e.g., tables, views etc.) via SQL DDL commands, and instance level constructs (rows) via SQL DML commands. Library metadata attributes and embedded resources may then be removed by removing their corresponding entries in the light-up model.

In an embodiment, the default uninstall mode follows a right inter-dependency order across the image files so as to uninstall the image files in a decremented manner. For example, in addition to removing contents from repository 330, this default mode may ensure the integrity of repository 330 by reconciling the dependencies of all the un-removed contents that depended on the removed contents. Moreover, the default mode might fix both the dependent contents installed in database and entries recorded in a light-up model, if present, to reflect to the new state of the database. Optionally, similar to their installation operation counterparts, users may control the un-installation process with modes like uninstall-by-force, uninstall with various degrees of dependency checks and generation of flavored SQL script on disk.

Figure 4:
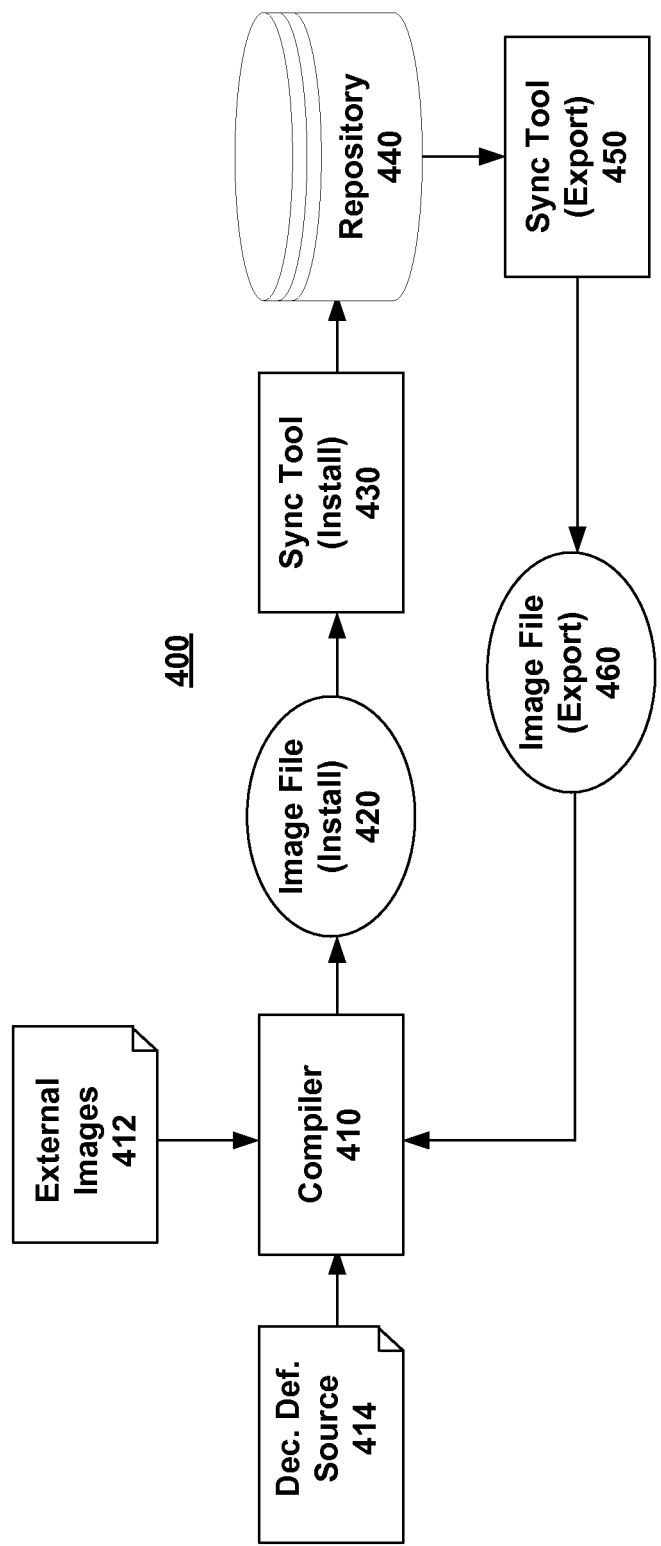
FIG. 4 is an illustration of an exemplary process for installing and exporting an image file according to an embodiment of the invention.

In FIG. 4, an illustration of an exemplary process for installing and exporting an image file, according to an embodiment of the invention, is provided. As illustrated, exemplary process 400 begins with compiler 410 compiling source code 414 and generating image file 420. For this particular example, it is assumed that source code 414 codifies a declarative execution model, which includes commands to install/export contents into/from repository 440. Accordingly, image file 414 represents a declarative definition to be installed into repository 440, wherein a portion of the declarative definition instructs repository 440 to export a desired set of contents.

Process 400 continues with sync tool 430 providing a bridge for installing image file 414 into repository 440. In an embodiment, since repository 440 may be one of several repositories in a system, sync tool 430 reads image file 420 to determine for which repository image file 420 is intended. Within such embodiment, sync tool 430 then scripts the contents of image file 414 into machine code specific to repository 440. Here, it should be appreciated that sync tool 430 may be configured to generate scripts in any of a plurality of languages. As such, some embodiments may require sync tool 430 to receive an indication of which language to script, wherein such indication may be obtained either directly from image file 420 and/or data received from repository 440.

Upon generation of the appropriate script, process 400 continues with the declarative definition of image file 420 being installed into repository 440 via the generated script. As stated previously, however, this particular definition is assumed to include instructions for repository 440 to export a portion of its contents. As such, in an exemplary export process, the generated script enables sync tool 450 to reason over the SQL catalog of repository 440 and, if present, a light-up model to extract the desired contents as image file 460. Process 400 then concludes with image file 460 being sent to compiler 410 where it may be installed into other repositories and/or used, either alone or with other image files 412, to compile subsequent source models.

In an embodiment of the invention, deployed objects of an image file may include reference identifiers. In FIG. 5, an exemplary illustration of an extensible storage abstraction having such identifier is provided. For this particular example, a table 500 is created from the following M code:
  Chris {Name="Chris";
  Age="25";
  Address="26 ELM ST";
  Photo=0xFEE}
As illustrated, table 500 may include Name column 510, Age column 520, Address column 530, and Photo column 540. Within such embodiment, entries corresponding to Name column 510, Age column 520, and Address column 530, might be visible to a particular RDBMS, whereas entries corresponding to Photo column 540 might be opaque and simply seen as a "blob." Such opacity provides a more efficient system in which the blob (e.g., a picture file, audio file, etc.) may be referenced in a single cell within Photo column 540, and where the actual blob might be stored as a packaged artifact and/or an externally stored entity. However, because the targeted RDBMS might not know how to interpret the blob's reference, an extended catalog may be embedded within the deployed image file to augment the RDBMS's default catalog.

It should be appreciated that, although the particular embodiment above describes referencing a blob within a single cell, another embodiment may store the blob's contents within a plurality of cells. For example, if the blob is a picture file, each cell may represent a particular pixel. As such, the photo may be stored as a plurality of pixels in which a user may query the pixels via SQL commands.

Figure 6:
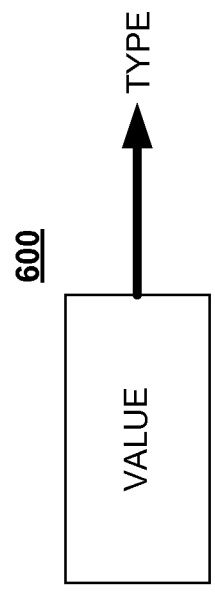
FIG. 6 is an illustration of a nominally typed execution system.
Figure 7:
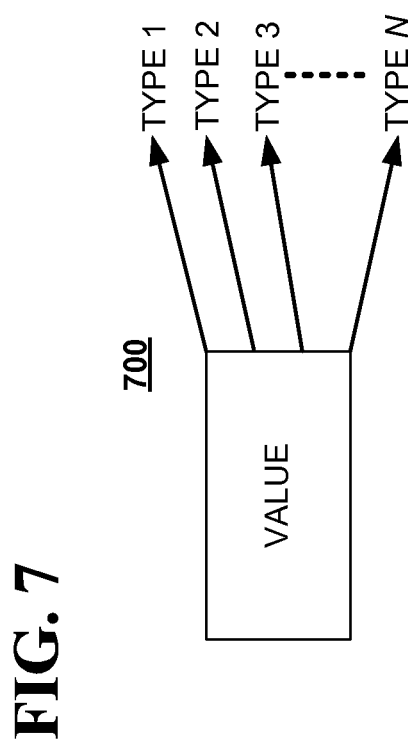
FIG. 7 is a non-limiting illustration of a type system associated with a constraint-based execution model according to an embodiment of the invention.

In one embodiment, the methods described herein are operable with a programming language having a constraint-based type system. Such a constraint-based system provides functionality not simply available with traditional, nominal type systems. In FIGS. 6-7, a nominally typed execution system is compared to a constraint-based typed execution system according to an embodiment of the invention. As illustrated, the nominal system 600 assigns a particular type for every value, whereas values in constraint-based system 700 may conform with any of an infinite number of types.

For an illustration of the contrast between a nominally-typed execution model and a constraint-based typed model according to a declarative programming language described herein, such as the M programming language, exemplary code for type declarations of each model are compared below.

First, with respect to a nominally-typed execution model the following exemplary C# code is illustrative:

```
class A
{
  public string Bar;
  public int Foo;
}
class B
{
  public string Bar;
  public int Foo;
}
```

For this declaration, a rigid type-value relationship exists in which A and B values are considered incomparable even if the values of their fields, Bar and Foo, are identical.

In contrast, with respect to a constraint-based model, the following exemplary M code (discussed in more detail below) is illustrative of how objects can conform to a number of types:

```
type A { Bar : Text; Foo : Integer; }
type B { Bar : Text; Foo : Integer; }
```

For this declaration, the type-value relationship is much more flexible as all values that conform to type A also conform to B, and vice-versa. Moreover, types in a constraint-based model may be layered on top of each other, which provides flexibility that can be useful, e.g., for programming across various RDBMSs. Indeed, because types in a constraint-based model initially include all values in the universe, a particular value is conformable with all types in which the value does not violate a constraint codified in the type's declaration. The set of values conformable with type defined by the declaration type T: Text where value<128 thus includes "all values in the universe" that do not violate the "Integer" constraint or the "value<128" constraint.

Thus, in one embodiment, the programming language of the source code is a purely declarative language that includes a constraint-based type system as described above, such as implemented in the M programming language.

In an embodiment, the synchronization method described herein may also be operable with a programming language having an order-independent execution model. Similar to the aforementioned constraint-based execution model, such an order-independent execution model provides flexibility that is also particularly useful for programming across various RDBMSs.

Figure 8:
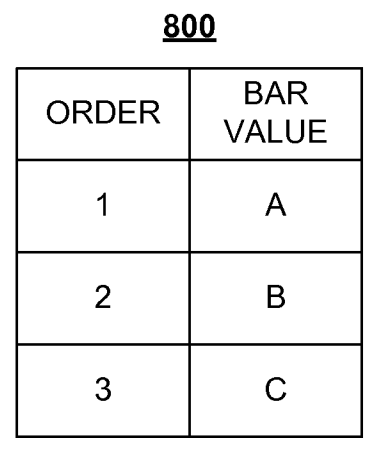
Figure 9:
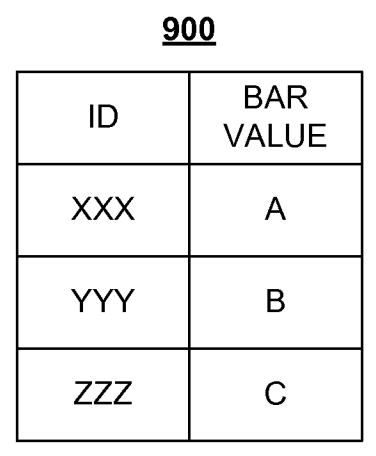

In FIGS. 8-9, a data storage abstraction according to an ordered execution model is compared to a data storage abstraction according to an order-independent execution model consistent with an embodiment of the invention. For this particular example, data storage abstraction 800 represents a list Foo created by an ordered execution model, whereas data abstraction 900 represents a similar list Foo created by an order-independent execution model according to an embodiment of the invention. As illustrated, each of data storage abstractions 800 and 900 include a set of three Bar values (i.e., "1", "2", and "3"). However, data storage abstraction 800 requires these Bar values to be entered/listed in a particular order, whereas data storage abstraction 900 has no such requirement. Instead, data storage abstraction 900 simply assigns an ID to each Bar value, wherein the order that these Bar values were entered/listed is unobservable to the targeted repository. Data storage abstraction 900 may have thus resulted from the following order-independent code:

```
f: Foo* = {Bar = "1"};
f: Foo* = {Bar = "2"};
f: Foo* = {Bar = "3"};
```

However, data storage abstraction 900 may have also resulted from the following code:

```
f: Foo* = {Bar = "3"};
f: Foo* = {Bar = "1"};
f: Foo* = {Bar = "2"};
```

Figure 10:
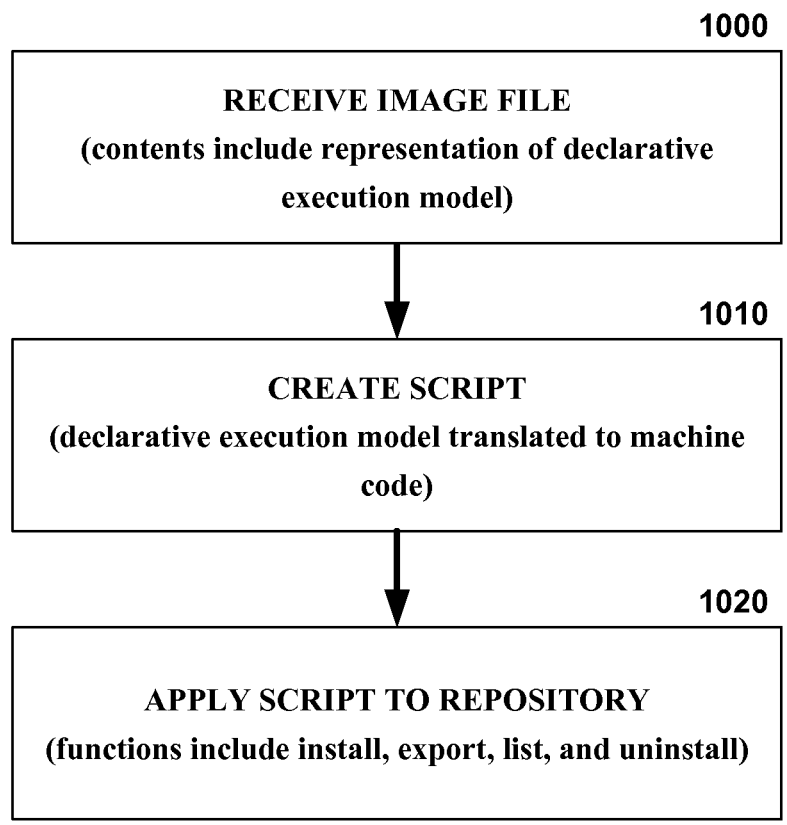
FIG. 10 is a flow diagram illustrating a process for synchronizing a repository with a declarative definition according to an embodiment of the invention.

And each of the two codes above may be functionally equivalent to the following code:

f: Foo*={{Bar="2"}, {Bar="3"}, {Bar="1"}};

In FIG. 10, a flow diagram illustrating an exemplary process for synchronizing an image file with a repository, according to an embodiment of the invention, is provided. As illustrated, the process begins at step 1000 where an image file is received by a synchronization component. Within such embodiment, the received image file represents a declarative execution model. In an embodiment, contents of the image file include deployed objects of a constraint-based and/or order-independent execution model. Such deployed objects may also include reference identifiers to other objects/image files.

Next, at step 1010 the process continues with the creation of a script in which the script translates the declarative execution model of the image file into machine code. In an embodiment, the synchronization component may be configured to generate scripts in any of a plurality of machine code languages. In another embodiment, the generated scripts may include SQL commands which enable the synchronization component to dynamically perform functions according to any of a plurality of conditions.

Finally, at step 1020, the script generated by the synchronization component at step 1010 is applied to a particular repository. Moreover, the generated script may be used to perform any of a plurality of functions on the targeted repository. Some of these functions may, for example, include installing contents of an image file into the repository and/or exporting contents of the repository as an image file. Other functions may include a listing function that may query the repository for particular image files that may have been installed, as well as an uninstall function that uninstalls contents of particular image files that may have been installed.

Exemplary Programming Language

An exemplary declarative language that is compatible with the scope and spirit of the present invention is the M programming language (hereinafter "M"), which was developed by the assignee of the present invention. However, in addition to M, it is to be understood that other similar programming languages may be used, and that the utility of the invention is not limited to any single programming language. It should be further understood that, because M is an evolving newly developed programming language, the particular syntaxes in the exemplary codes provided herein may vary with future syntaxes without departing from the scope and spirit of the subject application. A brief description of M is provided below.

M is a simple declarative language for working with data. M lets users determine how they want to structure and query their data using a convenient textual syntax that is both authorable and readable. An M program consists of one or more source files, known formally as compilation units, wherein the source file is an ordered sequence of Unicode characters. Source files typically have a one-to-one correspondence with files in a file system, but this correspondence is not required. For maximal portability, it is recommended that files in a file system be encoded with the UTF-8 encoding.

Conceptually speaking, an M program is compiled using four steps: 1) Lexical analysis, which translates a stream of Unicode input characters into a stream of tokens (Lexical analysis evaluates and executes preprocessing directives); 2) Syntactic analysis, which translates the stream of tokens into an abstract syntax tree; 3) Semantic analysis, which resolves all symbols in the abstract syntax tree, type checks the structure and generates a semantic graph; and 4) Code generation, which generates executable instructions from the semantic graph for some target runtime (e.g. SQL, producing an image). Further tools may link images and load them into a runtime.

M doesn't mandate how data is stored or accessed, nor does it mandate a specific implementation technology. Rather, M was designed to allow users to write down what they want from their data without having to specify how those desires are met against a given technology or platform. That stated, M in no way prohibits implementations from providing rich declarative or imperative support for controlling how M constructs are represented and executed in a given environment.

M builds on three basic concepts: values, types, and extents. Hereinafter, these three concepts are defined as follows: 1) A value is simply data that conforms to the rules of the M language, 2) A type describes a set of values, and 3) An extent provides dynamic storage for values.

In general, M separates the typing of data from the storage/extent of the data. A given type can be used to describe data from multiple extents as well as to describe the results of a calculation. This allows users to start writing down types first and decide where to put or calculate the corresponding values later.

On the topic of determining where to put values, the M language does not specify how an implementation maps a declared extent to an external store such as an RDBMS. However, M was designed to make such implementations possible and is compatible with the relational model.

One other important aspect of data management that M does not address is that of update. M is a functional language that does not have constructs for changing the contents of an extent. How data changes is outside the scope of the language, however again, M anticipates that the contents of an extent can change via external (to M) stimuli. Subsequent versions of M are expected to provide declarative constructs for updating data.

It is often desirable to write down how to categorize values for the purposes of validation or allocation. In M, values are categorized using types, wherein an M type describes a collection of acceptable or conformant values. Moreover, M types are used to constrain which values may appear in a particular context (e.g., an operand, a storage location).

With a few notable exceptions, M allows types to be used as collections. For example, the "in" operator can be used to test whether a value conforms to a given type, such as:

1 in Number
"Hello, world" in Text

It should be noted that the names of built-in types are available directly in the M language. New names for types, however, may also be introduced using type declarations. For example, the type declaration below introduces the type name "My Text" as a synonym for the "Text" simple type:

type [My Text]: Text;

With this type name now available, the following code may be written:

"Hello, world" in [My Text]

While it is moderately useful to introduce custom names for an existing type, it's far more useful to apply a predicate to an underlying type, such as:

type SmallText: Text where value.Count<7;

In this example, the universe of possible "Text" values has been constrained to those in which the value contains less than seven characters. Accordingly, the following statements hold true:

---

"Terse" in SmallText
!("Verbose" in SmallText)

---

Type declarations compose:
type TinyText: SmallText where value.Count<6;
However, in this example, this declaration is equivalent to the following:
type TinyText: Text where value.Count<6;

It is important to note that the name of the type exists simply so an M declaration or expression can refer to it. Any number of names can be assigned to the same type (e.g., Text where value.Count<7) and a given value either conforms to all of them or to none of them. For example, consider this example:

--- type A : Number where value < 100;
type B : Number where value < 100;

---

Given these two type definitions, both of the following expressions:
1 in A
1 in B
will evaluate to true. If the following third type is introduced:
type C: Number where value>0;

the following can also be stated:
1 in C

A general principle of M is that a given value may conform to any number of types. This is a departure from the way many object-based systems work, in which a value is bound to a specific type at initialization-time and is a member of the finite set of subtypes that were specified when the type was defined.

Another type-related operation that bears discussion is the type ascription operator (:). The type ascription operator asserts that a given value conforms to a specific type.

In general, when values in expressions are seen, M has some notion of the expected type of that value based on the declared result type for the operator/function being applied. For example, the result of the logical and operator (&&) is declared to be conformant with type "Logical."

It is occasionally useful (or even required) to apply additional constraints to a given value—typically to use that value in another context that has differing requirements. For example, consider the following simple type definition:

type SuperPositive: Number where value>5;

And let's now assume that there's a function named "CalcIt" that is declared to accept a value of type "SuperPositive" as an operand. It would be desirable for M to allow expressions like this:

CalcIt(20)
CalcIt(42+99)

and prohibit expressions like this:

CalcIt(-1)
CalcIt(4)

In fact, M does exactly what is wanted for these four examples. This is because these expressions express their operands in terms of simple built-in operators over constants. All of the information needed to determine the validity of the expressions is readily and cheaply available the moment the M source text for the expression is encountered.

However, if the expression draws upon dynamic sources of data and/or user-defined functions, the type ascription operator must be used to assert that a value will conform to a given type.

To understand how the type ascription operator works with values, let's assume that there is a second function, "GetVowelCount," that is declared to accept an operand of type "Text" and return a value of type "Number" that indicates the number of vowels in the operand.

Since it cannot be known based on the declaration of "GetVowelCount" whether its results will be greater than five or not, the following expression is not a legal M expression:

CalcIt(GetVowelCount(someTextVariable))

Because the declared result type (Number) of "GetVowelCount" includes values that do not conform to the declared operand type of "CalcIt" (SuperPositive), M assumes that this expression was written in error and will refuse to even attempt to evaluate the expression.

When this expression is rewritten to the following (legal) expression using the type ascription operator:

CalcIt((GetVowelCount(someTextVariable): SuperPositive))

M is essentially being told that there is enough understanding of the "GetVowelCount" function to know that a value that conforms to the type "SuperPositive" will always be returned. In short, the programmer is telling M that he/she knows what it is doing.

But what if the programmer does not know? What if the programmer misjudged how the "GetVowelCount" function works and a particular evaluation results in a negative number? Because the "CalcIt" function was declared to only accept values that conform to "SuperPositive," the system will ensure that all values passed to it are greater than five. To ensure this constraint is never violated, the system may need to inject a dynamic constraint test that has a potential to fail when evaluated. This failure will not occur when the M source text is first processed (as was the case with CalcIt(−1))—rather it will occur when the expression is actually evaluated.

Here, the general principle at play is as follows. M implementations will typically attempt to report any constraint violations before the first expression in an M document is evaluated. This is called static enforcement and implementations will manifest this much like a syntax error. However, some constraints can only be enforced against live data and therefore require dynamic enforcement.

In general, the M philosophy is to make it easy for users to write down their intention and put the burden on the M implementation to "make it work." However, to allow a particular M document to be used in diverse environments, a fully featured M implementation should be configurable to reject M documents that rely on dynamic enforcement for correctness in order to reduce the performance and operational costs of dynamic constraint violations.

M also defines a type constructor for specifying collection types. The collection type constructor restricts the type and count of elements a collection may contain. All collection types are restrictions over the intrinsic type "Collection," which all collection values conform to:

```
{ } in Collection
{ 1, false } in Collection
! ("Hello" in Collection)
```

The last example is interesting in that it demonstrates that the collection types do not overlap with the simple types. There is no value that conforms to both a collection type and a simple type.

A collection type constructor specifies both the type of element and the acceptable element count. The element count is typically specified using one of the three operators:

```
T* - zero or more Ts
T+ - one or more Ts
T#m..n - between m and n Ts.
```

The collection type constructors can either use Kleene operators or be written longhand as a constraint over the intrinsic type Collection—that is, the following two type declarations describe the same set of collection values:

```
type SomeNumbers : Number+;
type TwoToFourNumbers : Number#2..4;
type ThreeNumbers : Number#3;
type FourOrMoreNumbers : Number#4..;
```

These types describe the same sets of values as these longhand definitions:

```
type SomeNumbers : Collection where value.Count >= 1
        && item in Number;
type TwoToFourNumbers : Collection where value.Count >= 2
        && value.Count <= 4
        && item in Number;
```

```
type ThreeNumbers : Collection where value.Count == 3
        && item in Number;
type FourOrMoreNumbers : Collection where value.Count >= 4
        && item in Number;
```

Independent of which form is used to declare the types, the following can now be asserted:

```
!({ } in TwoToFourNumbers)
!({ "One", "Two", "Three" } in TwoToFourNumbers)
{ 1, 2, 3 } in TwoToFourNumbers
{ 1, 2, 3 } in ThreeNumbers
{ 1, 2, 3, 4, 5 } in FourOrMoreNumbers
```

The collection type constructors compose with the "where" operator, allowing the following type check to succeed:

{1, 2} in (Number where value<3)*where value.Count % 2==0 note that the inner "where" operator applies to elements of the collection, and the outer "where" operator applies to the collection itself.

Just as collection type constructors can be used to specify what kinds of collections are valid in a given context, the same can be done for entities using entity types.

An entity type declares the expected members for a set of entity values. The members of an entity type can be declared either as fields or as calculated values. The value of a field is stored; the value of a calculated value is computed. All entity types are restrictions over the Entity type, which is defined in the M standard library.

Here is the simplest entity type:
type MyEntity: Language.Entity;
The type "MyEntity" does not declare any fields. In M, entity types are open in that entity values that conform to the type may contain fields whose names are not declared in the type. That means that the following type test:
{X=100, Y=200} in MyEntity
will evaluate to true, as the "MyEntity" type says nothing about fields named X and Y.

Most entity types contain one or more field declarations. At a minimum, a field declaration states the name of the expected field:
type Point {X;Y;}
This type definition describes the set of entities that contain at least fields named X and Y irrespective of the values of those fields. That means that the following type tests:

```
{ X = 100, Y = 200 } in Point
{ X = 100, Y = 200, Z = 300 } in Point // more fields than
    expected OK
! ({ X = 100 } in Point)         // not enough fields - not OK
{ X = true, Y = "Hello, world" } in Point
``` will all evaluate to true.

The last example demonstrates that the "Point" type does not constrain the values of the X and Y fields—any value is allowed. A new type that constrains the values of X and Y to numeric values can now be written:

```
type NumericPoint {
    X : Number;
    Y : Number where value > 0;
}
```

Note that type ascription syntax is used to assert that the value of the X and Y fields must conform to the type "Number." With this in place, the following expressions:

```
{ X = 100, Y = 200 } in NumericPoint
{ X = 100, Y = 200, Z = 300 } in NumericPoint
! ({ X = true, Y = "Hello, world" } in NumericPoint)
! ({ X = 0, Y = 0 } in NumericPoint)
``` all evaluate to true.

As was seen in the discussion of simple types, the name of the type exists only so that M declarations and expressions can refer to it. That is why both of the following type tests succeed:

```
{ X = 100, Y = 200 } in NumericPoint
{ X = 100, Y = 200 } in Point
``` even though the definitions of NumericPoint and Point are independent.

Fields in M are named units of storage that hold values. M allows you to initialize the value of a field as part of an entity initializer. However, M does not specify any mechanism for changing the value of a field once it is initialized. In M, it is assumed that any changes to field values happen outside the scope of M.

A field declaration can indicate that there is a default value for the field. Field declarations that have a default value do not require conformant entities to have a corresponding field specified (such field declarations are sometimes called optional fields). For example, consider this type definition:

```
type Point3d {
    X : Number;
    Y : Number;
    Z = –1 : Number; // default value of negative one
}
```

Because the Z field has a default value, the following type test will succeed:
{X=100, Y=200} in Point3d
Moreover, if a type ascription operator is applied to the value:
({X=100, Y=200}: Point3d)
the Z Field can now be accessed like this:
({X=100, Y=200}: Point3d).Z
This expression will yield the value −1.

If a field declaration does not have a corresponding default value, conformant entities must specify a value for that field. Default values are typically written down using the explicit syntax shown for the Z field of "Point3d." If the type of a field is either nullable or a zero-to-many collection, then there is an implicit default value for the declaring field of null for optional and { } for the collection.

For example, consider this type:

```
type PointND {
    X : Number;
    Y : Number;
    Z : Number?;   // Z is optional
    BeyondZ : Number*; // BeyondZ is optional too
}
```

Again, the following type test will succeed:
{X=100, Y=200} in PointND
and ascribing the "PointND" to the value will allow these defaults to be obtained:

```
({ X = 100, Y = 200 } : PointND).Z == null
({ X = 100, Y = 200 } : PointND).BeyondZ == { }
```

The choice of using a zero-to-one collection or nullable type vs. an explicit default value to model optional fields typically comes down to style.

Calculated values are named expressions whose values are calculated rather than stored. An example of a type that declares such a calculated value is:

```
type PointPlus {
    X : Number;
    Y : Number;
    // a calculated value
    IsHigh( ) : Logical { Y > 0; }
}
```

Note that unlike field declarations which end in a semicolon, calculated value declarations end with the expression surrounded by braces.

Like field declarations, a calculated value declaration may omit the type ascription, as this example does:

```
type PointPlus {
    X : Number;
    Y : Number;
    // a calculated value with no type ascription
    InMagicQuadrant( ) { IsHigh && X > 0; }
    IsHigh( ) : Logical { Y > 0; }
}
```

When no type is explicitly ascribed to a calculated value, M will infer the type automatically based on the declared result type of the underlying expression. In this example, because the logical and operator used in the expression was declared as returning a "Logical," the "InMagicQuadrant" calculated value also is ascribed to yield a "Logical" value.

The two calculated values just defined and used did not require any additional information to calculate their results other than the entity value itself. A calculated value may optionally declare a list of named parameters whose actual values must be specified when using the calculated value in an expression. Here's an example of a calculated value that requires parameters:

```
type PointPlus {
    X : Number;
    Y : Number;
    // a calculated value that requires a parameter
    WithinBounds(radius : Number) : Logical {
        X * X + Y * Y <= radius * radius;
    }
    InMagicQuadrant( ) { IsHigh && X > 0; }
    IsHigh( ) : Logical { Y > 0; }
}
```

To use this calculated value in an expression, one must provide values for the two parameters:
({X=100, Y=200}: PointPlus).WithinBounds(50)
When calculating the value of "WithinBounds," M will bind the value 50 to the symbol radius—this will cause the "WithinBounds" calculated value to evaluate to false.

It is useful to note that both calculated values and default values for fields are part of the type definition, not part of the values that conform to the type. For example, consider these three type definitions:

```
type Point {
    X : Number;
    Y : Number;
}
type RichPoint {
    X : Number;
    Y : Number;
    Z = -1 : Number;
    IsHigh( ) : Logical { X < Y; }
}
type WeirdPoint {
    X : Number;
    Y : Number;
    Z = 42 : Number;
    IsHigh( ) : Logical { false; }
}
```

Because RichPoint and WeirdPoint only have two required fields (X and Y), the following can be stated:

```
{ X=1, Y=2 } in RichPoint
{ X=1, Y=2 } in WeirdPoint
```

However, the "IsHigh" calculated value is only available when one of these two types to the entity value are ascribed:

```
({ X=1, Y=2 } : RichPoint).IsHigh == true
({ X=1, Y=2 } : WeirdPoint).IsHigh == false
```

Because the calculated value is purely part of the type and not the value, when the ascription is chained like this:
(({X=1, Y=2}: RichPoint): WeirdPoint).IsHigh==false
its the outer-most ascription that determines which function is called.

A similar principle is at play with respect to how default values work. Again, the default value is part of the type, not the entity value. When the following expression is written:
({X=1, Y=2}: RichPoint).Z==-1
the underlying entity value still only contains two field values (1 and 2 for X and Y respectively). Where default values differ from calculated values is when ascriptions are chained. For example, consider the following expression:
(({X=1, Y=2}: RichPoint): WeirdPoint).Z==-1
Because the "RichPoint" ascription is applied first, the resultant entity has a field named Z whose value is −1, however, there is no storage allocated for the value (it's part of the type's interpretation of the value). When the "WeirdPoint" ascription is applied, the result of the first ascription is being applied, which does have a field named Z, so that value is used to specify the value for Z—the default value specified by "WeirdPoint" is not needed.

Like all types, a constraint may be applied to an entity type using the "where" operator. Consider the following type definition:

```
type HighPoint {
    X : Number;
    Y : Number;
} where X < Y;
```

In this example, all values that conform to the type "HighPoint" are guaranteed to have an X value that is less than the Y value. That means that the following expressions:

```
{ X = 100, Y = 200 } in HighPoint
! ({ X = 300, Y = 200 } in HighPoint)
``` both evaluate to true

Now consider the following type definitions:

```
type Point {
    X : Number;
    Y : Number;
}
type Visual {
    Opacity : Number;
}
type VisualPoint {
    DotSize : Number;
} where value in Point && value in Visual;
```

The third type, "VisualPoint," names the set of entity values that have at least the numeric fields X, Y, Opacity, and DotSize.

Because it is a common desire to factor member declarations into smaller pieces that can be easily composed, M provides explicit syntax support for this. The "VisualPoint" type definition can be rewritten using that syntax:

```
type VisualPoint : Point, Visual {
    DotSize : Number;
}
```

To be clear, this is just shorthand for the long-hand definition above that used a constraint expression. Both of these definitions are equivalent to this even longer-hand definition:

```
type VisualPoint = {
    X : Number;
    Y : Number;
    Opacity : Number;
    DotSize : Number;
}
```

Again, the names of the types are just ways to refer to types—the values themselves have no record of the type names used to describe them.

M also extends LINQ query comprehensions with several features to make authoring simple queries more concise. The keywords, "where" and "select" are available as binary infix operators. Also, indexers are automatically added to strongly typed collections. These features allow common queries to be authored more compactly as illustrated below.

As an example of where as an infix operator, this query extracts people under 30 from the "People" collection defined above:

```
from p in People
where p.Age = 30
select p
```

An equivalent query can be written:
People where value.Age=30
The "where" operator takes a collection on the left and a Boolean expression on the right. The "where" operator introduces a keyword identifier value in to the scope of the Boolean expression that is bound to each member of the collection. The resulting collection contains the members for which the expression is true. The expression:
Collection where Expression
is exactly equivalent to:

```
from value in Collection
where Expression
select value
```

The M compiler adds indexer members on collections with strongly typed elements. For the collection "People," the compiler adds indexers for "First(Text)," "Last(Text)," and "Age(Number)."
Collection.Field (Expression)
is equivalent to:

```
from value in Collection
where Field == Expression
select value
```

"Select" is also available as an infix operator. Consider the following simple query:
from p in People
select p.First+p.Last
This computes the "select" expression over each member of the collection and returns the result. Using the infix "select" it can be written equivalently as:
People select value.First+value.Last
The "select" operator takes a collection on the left and an arbitrary expression on the right. As with "where," "select" introduces the keyword identifier value that ranges over each element in the collection. The "select" operator maps the expression over each element in the collection and returns the result. The expression:
Collection select Expression
is exactly equivalent to:
from value in Collection
select Expression
A trivial use of the "select" operator is to extract a single field:
People select value.First
The compiler adds accessors to the collection so single fields can be extracted directly as "People.First" and "People.Last."
To write a legal M document, all source text must appear in the context of a module definition. A module defines a top-level namespace for any type names that are defined. A module also defines a scope for defining extents that will store actual values, as well as calculated values.
Here is a simple module definition:

```
module Geometry {
    // declare a type
    type Point {
        X : Integer; Y : Integer;
    }
    // declare some extents
    Points : Point*;
    Origin : Point;
    // declare a calculated value
    TotalPointCount { Points.Count + 1; }
}
```

In this example, the module defines one type named "Geometry.Point." This type describes what point values will look like, but doesn't mention any locations where those values can be stored.

This example also includes two module-scoped fields (Points and Origin). Module-scoped field declarations are identical in syntax to those used in entity types. However, fields declared in an entity type simply name the potential for storage once an extent has been determined; in contrast fields declared at module-scope name actual storage that must be mapped by an implementation in order to load and interpret the module.

Modules may refer to declarations in other modules by using an import directive to name the module containing the referenced declarations. For a declaration to be referenced by other modules, the declaration must be explicitly exported using an export directive.

For example, consider this module:

```
module MyModule {
    import HerModule; // declares HerType
    export MyType1;
    export MyExtent1;
    type MyType1 : Logical*;
    type MyType2 : HerType;
    MyExtent1 : Number*;
    MyExtent2 : HerType;
}
```

Note that only "MyType1" and "MyExtent1" are visible to other modules. This makes the following definition of "HerModule" legal:

```
module HerModule {
    import MyModule; // declares MyType1 and MyExtent1
    export HerType;
    type HerType : Text where value.Count < 100;
    type Private : Number where !(value in MyExtent1);
    SomeStorage : MyType1;
}
```

As this example shows, modules may have circular dependencies.

The types of the M language are divided into two main categories: intrinsic types and derived types. An intrinsic type is a type that cannot be defined using M language constructs but rather is defined entirely in the M Language Specification. An intrinsic type may name at most one intrinsic type as its super-type as part of its specification. Values are an instance of exactly one intrinsic type, and conform to the specification of that one intrinsic type and all of its super types.

A derived type is a type whose definition is constructed in M source text using the type constructors that are provided in the language. A derived type is defined as a constraint over another type, which creates an explicit subtyping relationship. Values conform to any number of derived types simply by virtue of satisfying the derived type's constraint. There is no a priori affiliation between a value and a derived type—rather a given value that conforms to a derived type's constraint may be interpreted as that type at will.

M offers a broad range of options in defining types. Any expression which returns a collection can be declared as a type. The type predicates for entities and collections are expressions and fit this form. A type declaration may explicitly enumerate its members or be composed of other types.

M is a structurally typed language rather than a nominally typed language. A type in M is a specification for a set of values. Two types are the same if the exact same collection of values conforms to both regardless of the name of the types. It is not required that a type be named to be used. A type expression is allowed wherever a type reference is required. Types in M are simply expressions that return collections.

If every value that conforms to type A also conforms to type B, it can be said that A is a subtype of B (and that B is a super-type of A). Subtyping is transitive, that is, if A is a subtype of B and B is a subtype of C, then A is a subtype of C (and C is a super-type of A). Subtyping is reflexive, that is, A is a (vacuous) subtype of A (and A is a super-type of A).

Types are considered collections of all values that satisfy the type predicate. For that reason, any operation on a collection can be applied to a type and a type can be manipulated with expressions like any other collection value.

M provides two primary means for values to come into existence: computed values and stored values (a.k.a. fields). Computed and stored values may occur with both module and entity declarations and are scoped by their container. A computed value is derived from evaluating an expression that is typically defined as part of M source text. In contrast, a field stores a value and the contents of the field may change over time.

Exemplary Networked and Distributed Environments

One of ordinary skill in the art can appreciate that the various embodiments for synchronizing a declarative definition with repository described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may cooperate to perform one or more aspects of any of the various embodiments of the subject disclosure.

Figure 11:
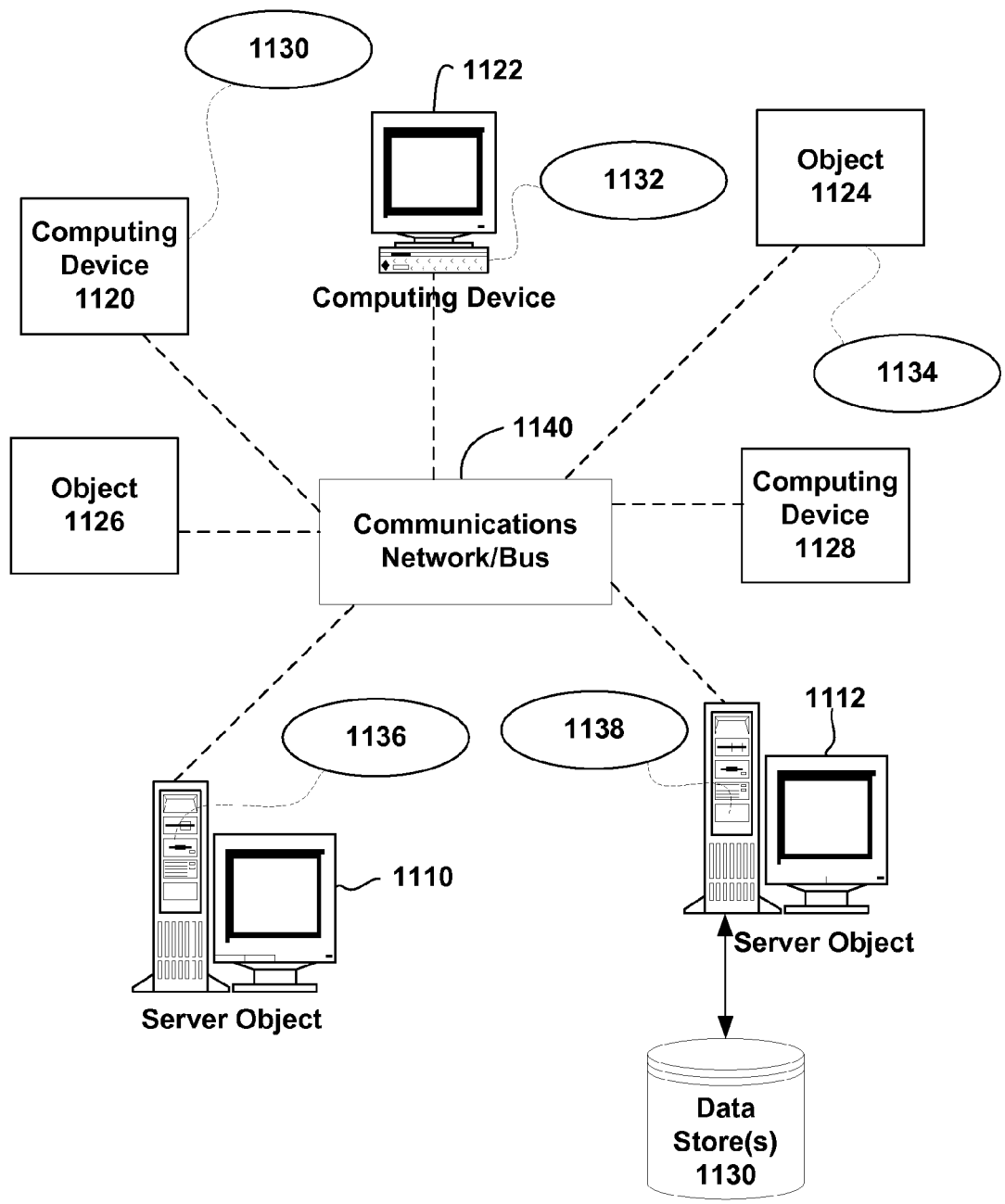
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that objects 1110, 1112, etc. and computing objects or devices 1120, 1122, 1124, 1126, 1128, etc. may comprise different devices, such as PDAs, audio/video devices, mobile phones, MP3 players, personal computers, laptops, etc.

Each object 1110, 1112, etc. and computing objects or devices 1120, 1122, 1124, 1126, 1128, etc. can communicate with one or more other objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each object 1110, 1112, etc. or 1120, 1122, 1124, 1126, 1128, etc. can also contain an application, such as applications 1130, 1132, 1134, 1136, 1138, that might make use of an API, or other object, software, firmware and/or hardware, suitable for communication with, processing for, or implementation of the column based encoding and query processing provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the column based encoding and query processing as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computers 1120, 1122, 1124, 1126, 1128, etc. can be thought of as clients and computers 1110, 1112, etc. can be thought of as servers where servers 1110, 1112, etc. provide data services, such as receiving data from client computers 1120, 1122, 1124, 1126, 1128, etc., storing of data, processing of data, transmitting data to client computers 1120, 1122, 1124, 1126, 1128, etc., although any computer can be considered a client, a server, or both, depending on the circumstances. Any of these computing devices may be processing data, encoding data, querying data or requesting services or tasks that may implicate the column based encoding and query processing as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the column based encoding and query processing can be provided standalone, or distributed across multiple computing devices or objects.

In a network environment in which the communications network/bus 1140 is the Internet, for example, the servers 1110, 1112, etc. can be Web servers with which the clients 1120, 1122, 1124, 1126, 1128, etc. communicate via any of a number of known protocols, such as the hypertext transfer protocol (HTTP). Servers 1110, 1112, etc. may also serve as clients 1120, 1122, 1124, 1126, 1128, etc., as may be characteristic of a distributed computing environment.

Exemplary Computing Device

As mentioned, advantageously, the techniques described herein can be applied to any device where it is desirable to query large amounts of data quickly. It should be understood, therefore, that handheld, portable and other computing devices and computing objects of all kinds are contemplated for use in connection with the various embodiments, i.e., anywhere that a device may wish to scan or process huge amounts of data for fast and efficient results. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 12:
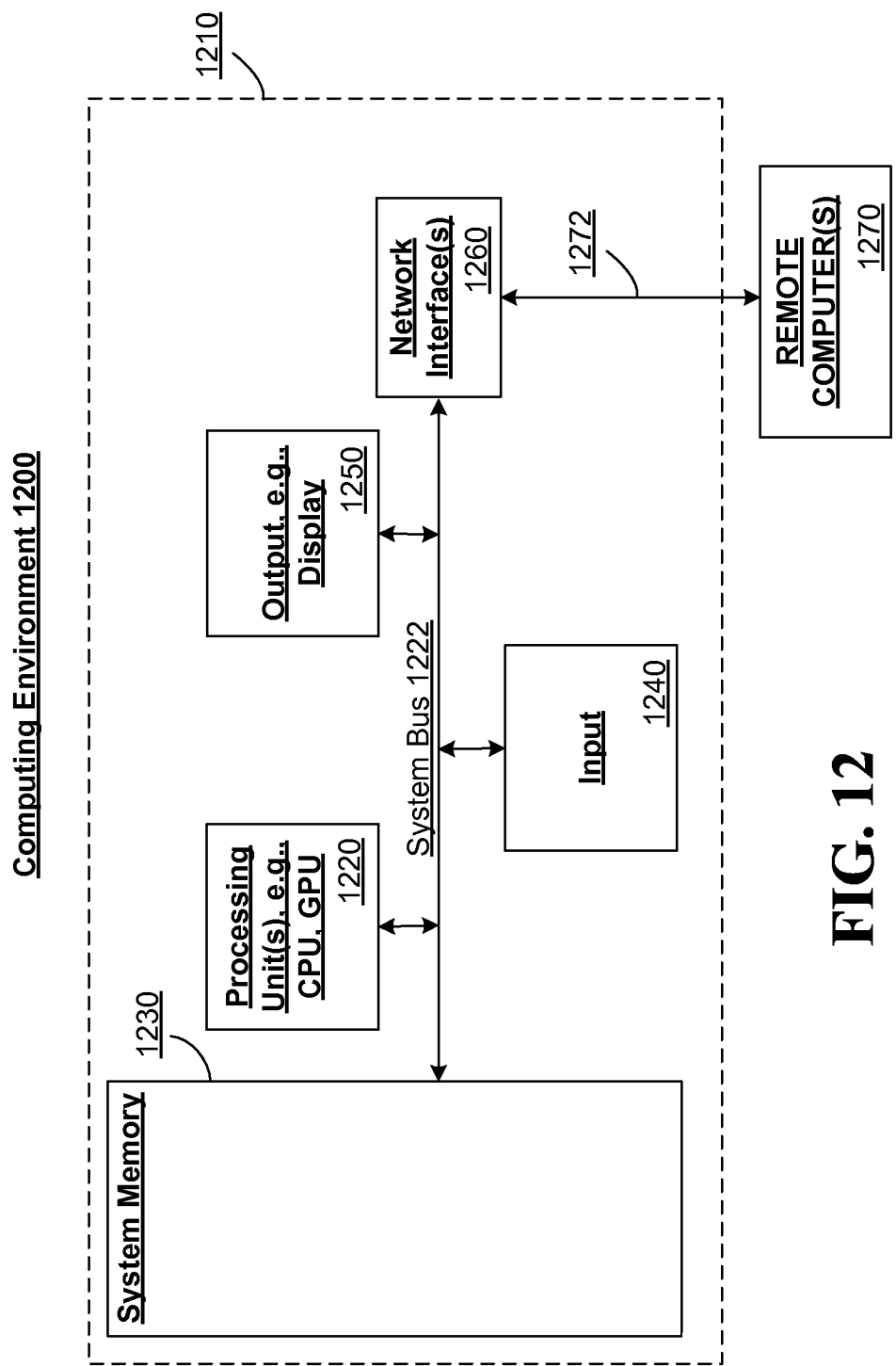
FIG. 12 is a block diagram representing an exemplary non-limiting computing system or operating environment in which one or more aspects of various embodiments described herein can be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither should the computing environment 1200 be interpreted as having any dependency or requirement relating to any one or combination of components illustrated in the exemplary operating environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to compress large scale data or process queries over large scale data.

Also, there are multiple ways to implement the same or similar functionality, e.g., an appropriate API, tool kit, driver code, operating system, control, standalone or downloadable software object, etc. which enables applications and services to use the efficient encoding and querying techniques. Thus, embodiments herein are contemplated from the standpoint of an API (or other software object), as well as from a software or hardware object that provides column based encoding and/or query processing. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A computer implemented method, including:
receiving, by a computer system, a post-processed definition of a declarative source code in which a declarative format of a compiled constraint-based execution model is preserved by packaging the post-processed definition to include a compiled transformation of the declarative source code and at least one artifact generated by the compiled transformation, wherein values in the compiled constraint-based execution model are conformable with any data construct type that does not violate a constraint codified in a type declaration, and wherein data construct types in the compiled constraint-based execution model initially include all values;
creating a script including a translation of the post-processed declarative definition;
applying the script to facilitate a management of the post-processed definition by a repository, wherein the management comprises augmenting a default system catalog of the repository with at least one data structure extracted from the post-processed definition;
querying data in the repository; and
performing at least one function based at least partly on the querying, the performing including performing an install function, and the querying including comparing a set of contents to be installed with a set of contents already installed.

2. The method of claim 1, further comprising: receiving data from the repository; and creating the script at least partly as a function of the data received from the repository.

3. The method of claim 1, the querying comprising querying the repository for interdependencies.

4. The method of claim 1, the performing including performing an install function, and the querying including determining whether to install a set of components by force.

5. The method of claim 1, further comprising recording extended information including recording metadata.

6. The method of claim 5, the performing further including reasoning over the extended information.

7. The method of claim 1, the receiving including receiving a declarative definition representing an order-independent execution model.

8. A computer-readable storage medium storing computer-executable instructions that, in response to execution by at least on one computing device, facilitate carrying out a method comprising:
receiving, by a computer system, a post-processed definition of a declarative source code in which a declarative format of a compiled constraint-based execution model is preserved by packaging the post-processed definition to include a compiled transformation of the declarative source code and at least one artifact generated by the compiled transformation, wherein values in the compiled constraint-based execution model are conformable with any data construct type that does not violate a constraint codified in a type declaration, and wherein data construct types in the compiled constraint-based execution model initially include all values;
creating a script including a translation of the post-processed declarative definition;
applying the script to facilitate a management of the post-processed definition by a repository, wherein the management comprises augmenting a default system catalog of the repository with at least one data structure extracted from the post-processed definition;
querying data in the repository; and
performing at least one function based at least partly on the querying, the performing including performing an install function, and the querying including comparing a set of contents to be installed with a set of contents already installed.

9. A system, including:
a receiving component configured to receive a post-processed definition of a declarative source code in which a declarative format of a compiled constraint-based execution model is preserved by packaging the post-processed definition to include a compiled transformation of the declarative source code and at least one artifact associated with the compiled transformation, wherein values in the compiled constraint-based execution model are conformable with any data construct type that does not violate a constraint codified in a type declaration, and wherein data construct types in the compiled constraint-based execution model initially include all values;
at least one processor coupled to the receiving component and configured to create a script including a translation of the post-processed declarative definition;
a communication component coupled to the at least one processor and to a target repository, and configured to facilitate a management of the post-processed definition by the target repository based at least partly on instructions provided by the script, wherein the management comprises augmenting a default system catalog of the target repository with at least one data structure extracted from the post-processed definition: and
a component configured to query data in the repository and to perform at least one function based at least partly on the querying, the performing including performing an install function, and the querying including comparing a set of contents to be installed with a set of contents already installed.

10. The system of claim 9, the post-processed declarative definition being configured to represent an order-independent execution model.

11. The system of claim 9, the at least one processor being configured to create scripts in a plurality of languages.

12. The system of claim 9, the at least one function being configured to be operable in a plurality of modes.

13. The system of claim 9, the at least one function including at least one of an install function, an export function, a list function, or an uninstall function.

14. A computer-implemented method, including:
receiving, by using a computer system, a post-processed definition of a declarative source code in which a declarative format of a compiled execution model that is constraint-based is preserved by packaging the post-processed definition to include a compiled transformation of the declarative source code and at least one artifact associated with the compiled transformation, wherein values in the compiled execution model are conformable with any data construct type that does not violate a constraint codified in a type declaration, and wherein data construct types in the compiled execution model are initially include all values;
generating a script as a function of data received from a running relational database management system (RDBMS);
including a translation of the post-processed declarative definition in the script;
facilitating a management of the post-processed declarative definition by a target repository based at least partly on instructions included in the script, wherein the management comprises querying the RDBMS for extended information representing at least one data structure associated with the RDBMS, and wherein the management further comprises augmenting a default system catalog of the target repository with the extended information;
querying data in the repository; and
performing the at least one function based at least partly on the querying data in the repository, the performing including performing an install function, and the querying data in the repository including comparing a set of contents to be installed with a set of contents already installed.

15. The method of claim 14, further comprising including machine code in the translation.

16. The method of claim 14, further comprising creating the post-processed declarative definition at least in part by pulling schema from the RDBMS.

17. The method of claim 14, further comprising installing source code corresponding to the compiled execution model in the target repository.

18. The method of claim 17, wherein a preserving of the-declarative format comprises including at least one of a runtime artifact or a designtime artifact in the post- processed definition.

* * * * *